(12) United States Patent
Pisanova et al.

(10) Patent No.: US 9,375,768 B2
(45) Date of Patent: Jun. 28, 2016

(54) ENVIRONMENTAL REMEDIATION PROCESS

(71) Applicant: PeroxyChem LLC, Philadelphia, PA (US)

(72) Inventors: Elena Pisanova, Amherst, NY (US); John Rovison, Sanborn, NY (US)

(73) Assignee: PEROXYCHEM LLC, Philadelphia, PA (US)

( * ) Notice: Subject to any disclaimer, the term of this patent is extended or adjusted under 35 U.S.C. 154(b) by 0 days.

(21) Appl. No.: 13/848,125

(22) Filed: Mar. 21, 2013

(65) Prior Publication Data

US 2013/0248461 A1 Sep. 26, 2013

Related U.S. Application Data

(60) Provisional application No. 61/614,246, filed on Mar. 22, 2012.

(51) Int. Cl.
| | |
|---|---|
| *C02F 1/72* | (2006.01) |
| *B09C 1/08* | (2006.01) |
| *B09C 1/00* | (2006.01) |
| *C02F 1/66* | (2006.01) |
| *C02F 101/30* | (2006.01) |
| *C02F 101/32* | (2006.01) |
| *C02F 101/36* | (2006.01) |

(52) U.S. Cl.
CPC . *B09C 1/08* (2013.01); *B09C 1/002* (2013.01); *C02F 1/72* (2013.01); *C02F 1/722* (2013.01); *C02F 1/66* (2013.01); *C02F 2101/30* (2013.01); *C02F 2101/322* (2013.01); *C02F 2101/36* (2013.01)

(58) Field of Classification Search
CPC .............. C02F 1/008; C02F 1/66; C02F 1/72; C02F 1/722; C02F 2101/30; C02F 2101/322; C02F 2101/36; B09C 1/002; B09C 1/08
See application file for complete search history.

(56) References Cited

U.S. PATENT DOCUMENTS

| | | | |
|---|---|---|---|
| 6,019,548 A | 2/2000 | Hoag et al. | |
| 7,473,372 B2 | 1/2009 | Block et al. | |
| 7,662,294 B1 | 2/2010 | Cox, Jr. | |
| 7,745,680 B1 | 6/2010 | Cox, Jr. | |
| 7,928,277 B1 | 4/2011 | Cox, Jr. | |
| 7,968,761 B1 | 6/2011 | Cox, Jr. | |
| 2002/0088759 A1* | 7/2002 | Krulik et al. | 210/723 |
| 2006/0042665 A1 | 3/2006 | Fernholz et al. | |
| 2007/0189855 A1* | 8/2007 | Sethi et al. | 405/128.75 |
| 2008/0105282 A1 | 5/2008 | Fernholz et al. | |
| 2013/0324442 A1 | 12/2013 | Hall et al. | |

FOREIGN PATENT DOCUMENTS

| | | |
|---|---|---|
| WO | WO 02/04359 A1 | 1/2002 |
| WO | WO 2006/128797 A1 | 12/2006 |

OTHER PUBLICATIONS

Liang C., Bruell C.J., et al. Persulfate Oxidation for in-situ remediation of TCE. II. Activated by chelated ferrous ion. Chemosphere, 2004, V. 55(9), pp. 1225-1233.
Crimi M., Taylor J. Experimental evaluation of catalyzed hydrogen peroxide and sodium persulfate for destruction of BTEX contaminants. Soil & Sediment Contamination, 2007, V. 16, pp. 29-45.
Average U.S.A. ground water temperature map found at http://www.thetankless.com/uploads/Average%20water%20temp%20map2.pdf.
Groundwater Temperature Map found at http://www.enoscientific.com/groundwater-temp-map.htm.
Question: What is the temperature of the available groundwater? found at http://www.wellowner.org/geothermal-heat-ground-water/.
PeroxyChem Publication titled "Activating Klozur® Persulfate with Iron-EDTA" found at http://www.peroxychem.com/media/131328/PeroxyChem-Klozur-FeEDTA-Activation.pdf.
Ahmad, M. et al., "Oxidative and Reductive Pathways in iron-Ethylenediaminetetraacetic Acid-Activated Persulfate Systems," J. Environ. Eng., 2012, 138(4): 411-418.
Product stability and pH found at https://www.akzonobel.com/micronutrients/products/product_stability/.
Liang, C. et al., "Hydroxypropyl-β-Cyclodextrin-Mediated Iron-Activated Persulfate Oxidation of Trichloroethylene and Tetrachloroethylene," Ind. Eng. Chem. Res., vol. 46, No. 20, 2007, 6466-6479.
Leite, R. A., et al., "Inclusion compounds between a-, b- and g-cyclodextrins: iron II lactate: a theoretical and experimental study using diffusion coefficients and molecular mechanics," Journal of Molecular Structure 644 (2003) 49-53.

* cited by examiner

*Primary Examiner* — Lucas Stelling
(74) *Attorney, Agent, or Firm* — Duane Morris LLP

(57) ABSTRACT

The present invention is directed to a method of oxidizing an organic compound present in soil, groundwater, process water or wastewater comprising contacting such organic compound with a persulfate and ferrous lactate.

8 Claims, No Drawings

ENVIRONMENTAL REMEDIATION PROCESS

FIELD OF THE INVENTION

The present invention is directed to a method of oxidizing an organic compound present in soil, groundwater, process water or wastewater comprising contacting such organic compound with a persulfate and ferrous lactate.

BACKGROUND OF THE INVENTION

The presence of volatile organic compounds ("VOCs"), semi volatile organic compounds ("SVOCs") or pesticides in subsurface soils and groundwater is a well-documented and extensive problem in industrialized and industrializing countries. Many VOC's and SVOC's are compounds which are toxic or carcinogenic, and which are often capable of moving through the soil under the influence of gravity and serve as a source of water contamination by dissolution into water passing through the contaminated soil. Illustrative of such organic contaminants are compounds such as trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether (MTBE), polyaromatic hydrocarbons, polychlorobiphenyls, phthalates, 1,4-dioxane, nitrosodimethyl amine, and methyl tertbutyl ether.

In many cases discharge of these compounds into the soil leads to contamination of aquifers resulting in potential public health impacts and degradation of groundwater resources for future use. Treatment and remediation of soils contaminated with VOC or SVOC compounds may be expensive, require considerable time, and in many cases be incomplete or unsuccessful. Treatment and remediation of volatile organic compounds that are either partially or completely immiscible with water (i.e., Non Aqueous Phase Liquids or NAPLs) have been particularly difficult. Also treatment of highly soluble but biologically stable organic contaminants such as MTBE and 1,4-dioxane are also quite difficult with many conventional remediation technologies. This is particularly true if these compounds are not significantly naturally degraded, either chemically or biologically, in soil environments. NAPLs present in the subsurface can be toxic to humans and other organisms and can slowly release dissolved aqueous or gas phase volatile organic compounds to the groundwater resulting in long-term (i.e., decades or longer) sources of chemical contamination of the subsurface. In many cases subsurface groundwater contaminant plumes may extend hundreds to thousands of feet from the source of the chemicals resulting in extensive contamination of the subsurface. These chemicals may then be transported into drinking water sources, lakes, rivers, and even basements of homes through volatilization from groundwater.

The U.S. Environmental Protection Agency (USEPA) has established maximum concentration limits for various hazardous compounds. Very low and stringent drinking water limits have been placed on many halogenated organic compounds. For example, the maximum concentration limits for solvents such as trichloroethylene, tetrachloroethylene, and carbon tetrachloride have been established at 5 .mu.g/L, while the maximum concentration limits for chlorobenzenes, polychlorinated biphenyls (PCBs), and ethylene dibromide have been established by the USEPA at 100 .mu.g/L, 0.5 .mu./L, and 0.05 .mu.g/L, respectively. Accordingly, there is a need for improved methods of achieving environmental remediation.

U.S. Pat. No. 7,473,372 broadly discloses the use of chelated species of divalent and trivalent transition metals (particularly iron) to catalyze water soluble peroxygen compounds such as persulfate. By complexing the transition metal catalyst with a chelant, the survivability of the catalyst is greatly enhanced. Although the specific chelants identified in this patent, particularly ethylenediaminetetraacetic acid (EDTA), effectively catalyze persulfate, it would nevertheless be desirable to possess other chelated catalysts which showed enhance activity at the lower temperatures, often of about 10° C. or less, at which the in situ remediation of contaminated environmental media takes place.

SUMMARY OF THE INVENTION

The present invention is directed to a method of oxidizing an organic compound present in soil, groundwater, process water or wastewater comprising contacting such organic compound with a persulfate and ferrous lactate.

DESCRIPTION OF THE PREFERRED EMBODIMENTS

The present invention is directed to a method of oxidizing an organic compound present in soil, groundwater, process water or wastewater comprising contacting such organic compound with a persulfate and ferrous lactate.

The present invention is a method for remediation of soil, sediment, clay, rock, and the like (hereinafter collectively referred to as "soil"); groundwater (i.e., water found underground in cracks and spaces in soil, sand and rocks); process water (i.e., water resulting from various industrial processes) or wastewater (i.e., water containing domestic or industrial waste) contaminated with volatile organic compounds, semi-volatile organic compounds, pesticides or herbicides. In addition, it may be used to treat sludges, sands or tars.

Illustrative of the organic contaminants which may oxidized by the process of this invention are trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

The persulfates which may be employed include mono- and dipersulfates, as well as mixtures thereof. Preferably, dipersulfates such as sodium persulfate, potassium persulfate, and/or ammonium persulfate are employed, with sodium dipersulfate being particularly preferred.

The ferrous lactate is employed in an amount sufficient to activate the persulfate. The concentration of the chelated metal catalyst used in the present invention may generally vary to provide from 1 to 1000 ppm of the metal cation.

In the practice of the present invention, the persulfate and ferrous lactate may be combined into an aqueous composition prior to treatment and co-injected into the environmental medium to be treated. Alternatively, such components may be sequentially or simultaneously injected into such environmental medium.

When used in the environmental remediation of soil and/or groundwater, the persulfate should be employed in amounts sufficient to satisfy the soil oxidant demand, compensate for any decomposition and oxidize and destroy the majority if not all of the organic compounds. Soil oxidant demand, (SOD), is the loss of persulfate due to reaction with soil matrix components as well as through auto-decomposition of the persulfate, as well as the chemical oxidant demand, and to compensate for any decomposition of the peroxygen compound.

One method for calculating the preferred amount of persulfate to be used per unit soil mass (for an identified volume of soil at the site) is to first determine the minimum amount of persulfate needed to fully satisfy soil oxidant demand per unit mass of uncontaminated soil. A contaminated soil sample from the identified volume of soil is then treated with that predetermined (per unit mass) amount of persulfate; and the minimum amount of persulfate required to eliminate the organic compounds in that treated sample is then determined Chemical reaction stoichiometry governs the mass/mass ratios and thus the total amount required to achieve the desired result. In actuality the amount of persulfate injected into various locations at a single contaminated site will vary depending upon what is learned from the core samples and other techniques for mapping the subsurface conditions.

SOD also may be calculated according to the formula (I):

$$SOD = V^*(C_0 - C_f)/M_s \quad (I)$$

Where $V$=volume of the groundwater used in the sample
$C_0$=initial concentration of persulfate at time 0
$C_f$=concentration of persulfate after 48 hours
$M_s$=mass of soil used in the sample Depending upon the type of soil, target compounds, and other oxidant demand at the site, the concentrations of persulfate in the solution used in the present invention may vary from about 0.5 mg/L to greater than about 450,000 mg/L. The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells or borings can be drilled at various locations in and around the suspected contaminated site to determine, as closely as possible, where the contamination is located. Core samples can be withdrawn, being careful to protect the samples from atmospheric oxidation. The samples can then be used to determine soil oxidant demand, chemical (e.g. VOC) oxidant demand and the oxidant stability existing in the subsurface. The precise chemical compounds in the soil and their concentration can be determined. Contaminated groundwater can be collected. Oxidants can be added to the collected groundwater during laboratory treatability experiments to determine which compounds are destroyed, in what order and to what degree, in the groundwater. It can then be determined whether the same oxidants are able to destroy those chemicals in the soil environment.

The goal is for the concentration of persulfate in the injected solution to be just enough to result in the persulfate reaction front traveling throughout the area of contamination requiring treatment in sufficient quantity to oxidize the contaminants present. (The saturated soil zone is the zone of soil which lies below the water table and is fully saturated. This is the region in which groundwater exists and flows.) In certain saturated soil zones where the natural velocity of the groundwater is too slow for the purposes of treatment within a certain timeframe, the velocity of groundwater can be increased by increasing the flow rate of the injected persulfate solution or installation of groundwater extraction wells to direct the flow of the injected persulfate solution. Certain soils to be treated may be in unsaturated zones and the method of persulfate injection may be based on infiltration or trickling of the persulfate solution into the subsurface to provide sufficient contact of the soils with the injected chemicals.

In addition, the persulfate and ferrous lactate may be applied and distributed through the soils, in either saturated or unsaturated conditions through the use of a soil blending process. Such a process makes use of in situ soil blenders, such as rotating drum heads, auguring devices or excavator/backhoe mixing, to blend the oxidant and activator into the soil and provide a more homogenous mixture, allowing for improved contact between the contaminant and the oxidant.

The process of the present invention may be employed in situ or ex situ. For in situ soil treatment, injection rates must be chosen based upon the hydro geologic conditions, that is, the ability of the oxidizing solution to displace, mix and disperse with existing groundwater and move through the soil. Additionally, injection rates must be sufficient to satisfy the soil oxidant demand and chemical oxidant demand in a realistic time frame. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and this process is not different in that respect.

The following Examples are provided to further illustrate the invention, but are not intended to limit the scope of the invention in any manner.

EXAMPLE

Example 1

A spiked solution containing volatile organic compounds was prepared by adding 10-20 ppm of benzene and trichloroethylene to deionized water. Samples of such solution were poured into 40 mL vials. Control samples of the spiked solution were stored at 2° C. in sealed vials without any headspace. Sodium persulfate and chelated activator (ferrous-EDTA or ferrous lactate) were added to other samples in the amounts indicated below, and sealed samples with no headroom were similarly stored at 2° C.

After the times indicated, vials were placed into an Autosampler (O.I. Analytical 4552) for a Purge & Trap analysis of VOC content. Quantitative analysis of VOCs was performed using and Purge & Trap sample concentrator (O.I. Analytical 4560) followed by GC-MS analysis (Shimadzu GCMS-QP2010), according to EPA methods 5030 and 8260. GC-MS was calibrated before testing using standard solutions of Benzene and TCE.

The results indicating the percentage of the initial benzene and trichloroethylene concentration remaining are shown in Table 1 below.

TABLE 1

Percentages of VOCs Remaining

| Activator | Persulfate initial dosage g/L | Activator initial dosage mg of Fe/L | Time days | Benzene % Remaining | TCE % Remaining |
|---|---|---|---|---|---|
| None | 5.0 | 0 | 4 | 99 | 99 |
| Fe EDTA | 5.0 | 50 | 4 | 75 | 73 |

TABLE 1-continued

Percentages of VOCs Remaining

| Activator | Persulfate initial dosage g/L | Activator initial dosage mg of Fe/L | Time days | Benzene % Remaining | TCE % Remaining |
|---|---|---|---|---|---|
| Fe EDTA | 5.0 | 100 | 4 | 62 | 61 |
| Fe Lactate | 5.0 | 50 | 2 | 13 | 30 |
| Fe Lactate | 5.0 | 100 | 2 | 0 | 0 |
| Fe Lactate | 5.0 | 10 | 7 | 43 | 61 |
| Fe Lactate | 5.0 | 25 | 7 | 25 | 42 |
| Fe Lactate | 5.0 | 50 | 7 | 7 | 21 |
| Fe Lactate | 5.0 | 100 | 7 | 0 | 0 |
| Fe Lactate | 1.0 | 10 | 7 | 58 | 59 |
| Fe Lactate | 1.0 | 25 | 7 | 30 | 49 |
| Fe Lactate | 1.0 | 50 | 7 | 15 | 28 |
| Fe Lactate | 1.0 | 100 | 7 | 0 | 0 |

The above-data shows that ferrous lactate provides unexpectedly desirable activation of persulfate at the lower temperatures at which much environmental remediation occurs.

What is claimed is:

1. A method of oxidizing an organic compound present in soil or groundwater comprising contacting such organic compound with a persulfate and ferrous lactate in an amount sufficient to activate the persulfate.

2. The method of claim 1 wherein the persulfate is a dipersulfate.

3. The method of claim 2 wherein the dipersulfate is sodium persulfate.

4. The method of claim 1 wherein the organic contaminant is selected from the group consisting of trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

5. The method of claim 1 wherein such method is performed in situ.

6. The method of claim 1 wherein such method is performed ex situ.

7. The method of claim 5 wherein the persulfate and ferrous lactate are added simultaneously.

8. The method of claim 5 wherein the persulfate and ferrous lactate are added sequentially.

* * * * *